(12) United States Patent
Reilly et al.

(10) Patent No.: US 6,936,203 B2
(45) Date of Patent: Aug. 30, 2005

(54) CLOSED DIE ARRAY FOR MULTI-LAYERED ARTICLES

(75) Inventors: Patrick John Reilly, Akron, OH (US); Dale Roy Norton, Medina, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 327 days.

(21) Appl. No.: 10/278,521

(22) Filed: Oct. 23, 2002

(65) Prior Publication Data

US 2003/0107151 A1 Jun. 12, 2003

Related U.S. Application Data

(63) Continuation-in-part of application No. 10/149,043, filed as application No. PCT/US99/30465 on Dec. 20, 1999.

(51) Int. Cl.[7] .......................... B29C 63/00; B28B 5/00; D01D 5/24
(52) U.S. Cl. ..................... 264/176.1; 264/211.23; 264/216; 264/241; 264/209.1
(58) Field of Search .............................. 264/241, 176.1, 264/211.23, 216, 209.1

(56) References Cited

U.S. PATENT DOCUMENTS

| | | | |
|---|---|---|---|
| 5,628,950 A | 5/1997 | Schrenk et al. ............. | 264/241 |
| 5,866,265 A | * 2/1999 | Reilly et al. ................. | 428/492 |
| 6,159,613 A | * 12/2000 | Reilly et al. ................. | 428/492 |

FOREIGN PATENT DOCUMENTS

| | | | |
|---|---|---|---|
| EP | 492890 A1 | 7/1992 | .......... B29C/47/70 |
| EP | 795397 A1 | 9/1997 | .......... B32B/25/00 |
| WO | 9936248 | 1/1999 | .......... B29C/47/70 |

OTHER PUBLICATIONS

Polymer Engineering and Science, Feb. 1997, vol. 37, No. 2, pp. 355–362, Chad D. Mueller, Sergei Nazarenko, Thomas Ebeling, Thomas L. Schuman, Anne Hiltner and Eric Baer, Novel Structures by Microlayer Coextrusion–Talc–Filled PP, PC/SAN, and HDPE/LLDPE.

* cited by examiner

*Primary Examiner*—Stephen J. Lechert, Jr.
(74) *Attorney, Agent, or Firm*—Nancy T. Krawczyk

(57) ABSTRACT

An array of dies having a closed configuration is used in a method and apparatus for making a closed composite article that comprises multilayered materials. In the method and apparatus, at least two extruders are used to extrude at least two material streams through the die array to provide an extrudate comprised of alternate layers of material from the at least two material streams. The compositions in the two material streams can be the same or different.

9 Claims, 6 Drawing Sheets

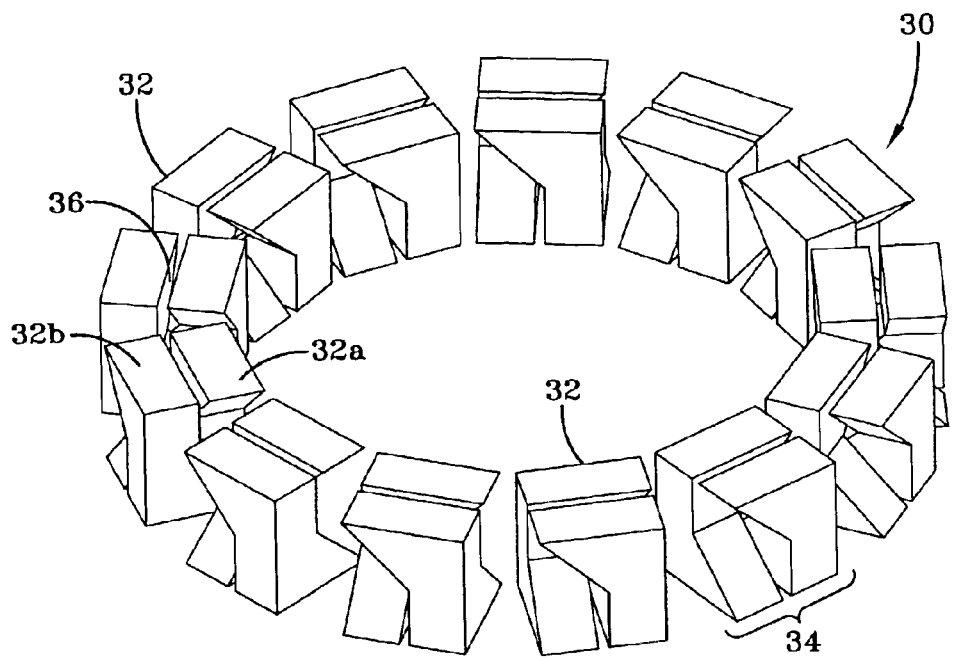
FIG-5
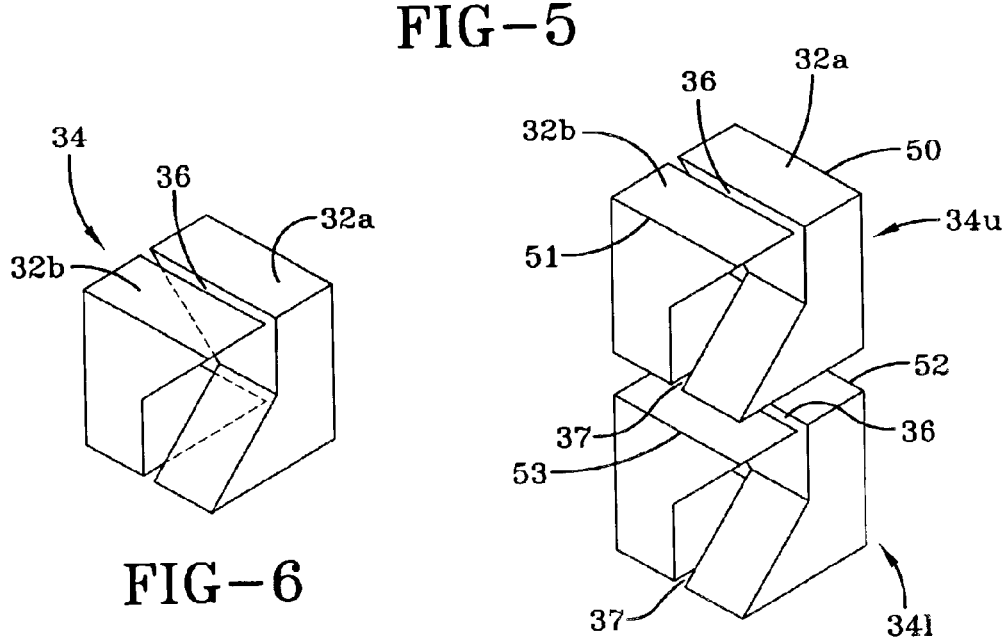
FIG-6
FIG-7

US 6,936,203 B2

CLOSED DIE ARRAY FOR MULTI-LAYERED ARTICLES

The present application is a Continuation-In-Part of copending U.S. application Ser. No. 10/149,043, filed Jun. 3, 2002, which was based upon PCT application PCT/US99/30465, filed Dec. 20, 1999.

FIELD OF THE INVENTION

The present invention relates to a method and apparatus for extruding a multi-layered product. More particularly, the apparatus and product formed have a closed configuration such as an ellipse or circular.

BACKGROUND OF THE INVENTION

Forming articles of multiple layers, whether the layers are of similar or different materials, is known. Layered rubber articles comprised of many alternating layers of different rubbers have been described by Frerking in U.S. Pat. No. 5,178,702, wherein air barrier/low temperature properties are improved in horizontally layered composites. Such composites can be prepared by hand by plying up alternating layers of two or more different rubber compounds.

Sluijters in U.S. Pat. No. 3,051,453 describes a mixing apparatus designed to mix two streams of liquid by splitting and rejoining the streams in a particular geometric way (a static mixer), which the instant inventors have found can be used with rubber to produce a layered, instead of a mixed product. Reilly et al. in U.S. Pat. No. 5,866,265 have used this concept to split elastomer streams and have caused the streams to flow back together to form a layered material. Said patent is incorporated herein by reference.

The apparatus and method taught by Reilly et al. comprised a single set of stacked dies and was useful for proving that the concept could be used to produce a layered material for laboratory characterization. No apparatus or method is known in the art for making commercially usable microlayered elastomeric materials.

All of the known methods and techniques are directly to forming linear, continuous products.

SUMMARY OF THE INVENTION

The present invention is directed to an apparatus and a method for producing a multi-layered closed article. The layers may be of identical, similar, or different extruded materials. The layers may be arranged concentrically or in vertical type sectors about the closed article. The closed article being defined as an article that has a defined interior and exterior and may be continuous in only one plane.

In the apparatus disclosed, the apparatus has extruding means for extruding at least two streams of material, at least two die plates attached to the output end of the extruding means and a profile die attached to the last of the at least two die plates wherein the layered streams are merged to form a closed unitary layered article. The die plates receive the extruded material streams and each die plate has an array of flow channels. The array is arranged in a closed rectilinear or curvilinear configuration to produce the desired closed article. Each flow channels has a separation means whereby the material streams being received into each die plate are split into portions by the separation means, and the portions are directed to be stacked to form layered streams.

In one aspect of the disclosed invention, the die array has at least 6 pairs of die channels. The closed configuration assumed by the die array may be circular, elliptical, square, or rectangular.

In the disclosed method, the method has the following steps: providing extruding means for simultaneously extruding at least two different material streams, directing a first material stream into a first die channel, directing a second material stream into a second die channel, whereby said first die channel and said second die channel direct said first material streams to be stacked and pressed side by side as it exits the die channels, and providing a plurality of die channels side by side to form a die array to provide an extrudate of a closed configuration comprising at least four layers of the first material and the second material are being stacked alternately side by side vertically or concentrically.

In one aspect of the disclosed method, the material compositions for the at least two different material streams are different. In another aspect of the method, the two different material streams are two different plastic or thermoplastic materials.

BRIEF DESCRIPTION OF THE DRAWINGS

The invention will be described by way of example and with reference to the accompanying drawings in which:

FIG. 5 illustrates a pair of channels;

FIG. 6 illustrates a stack of channel pairs;

FIG. 7 illustrates the reverse side of the die plate of FIG. 3;

DETAILED DESCRIPTION OF THE INVENTION

Figure 1:
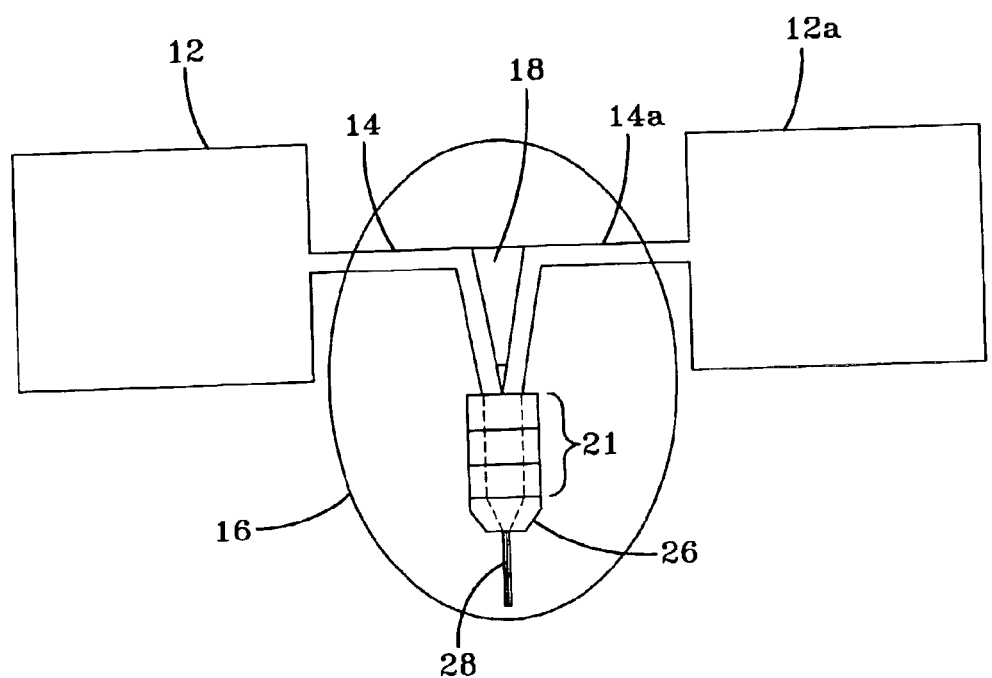
FIG. 1 illustrates two extruders, head to head, for extruding two streams of material through a die to form a multi-layered extrudate.

With reference now to FIG. 1, a very simplistic schematic is illustrated for the production of a multi-layered article. Two extruders 12 and 12a are illustrated oriented head-to-head whereby the two extruders are used to extrude the same or different rubber or plastic, or mixtures thereof (hereinafter referred to as material), simultaneously through barrels 14 and 14a. Extruders 12 and 12a may be single screw extruders, mixing extruders, such as twin screw extruders, or they may be injection mold extruders. Those skilled in the art will recognize that other orientations of the extruders are possible, e.g., above and below, and side by side.

Figure 2:
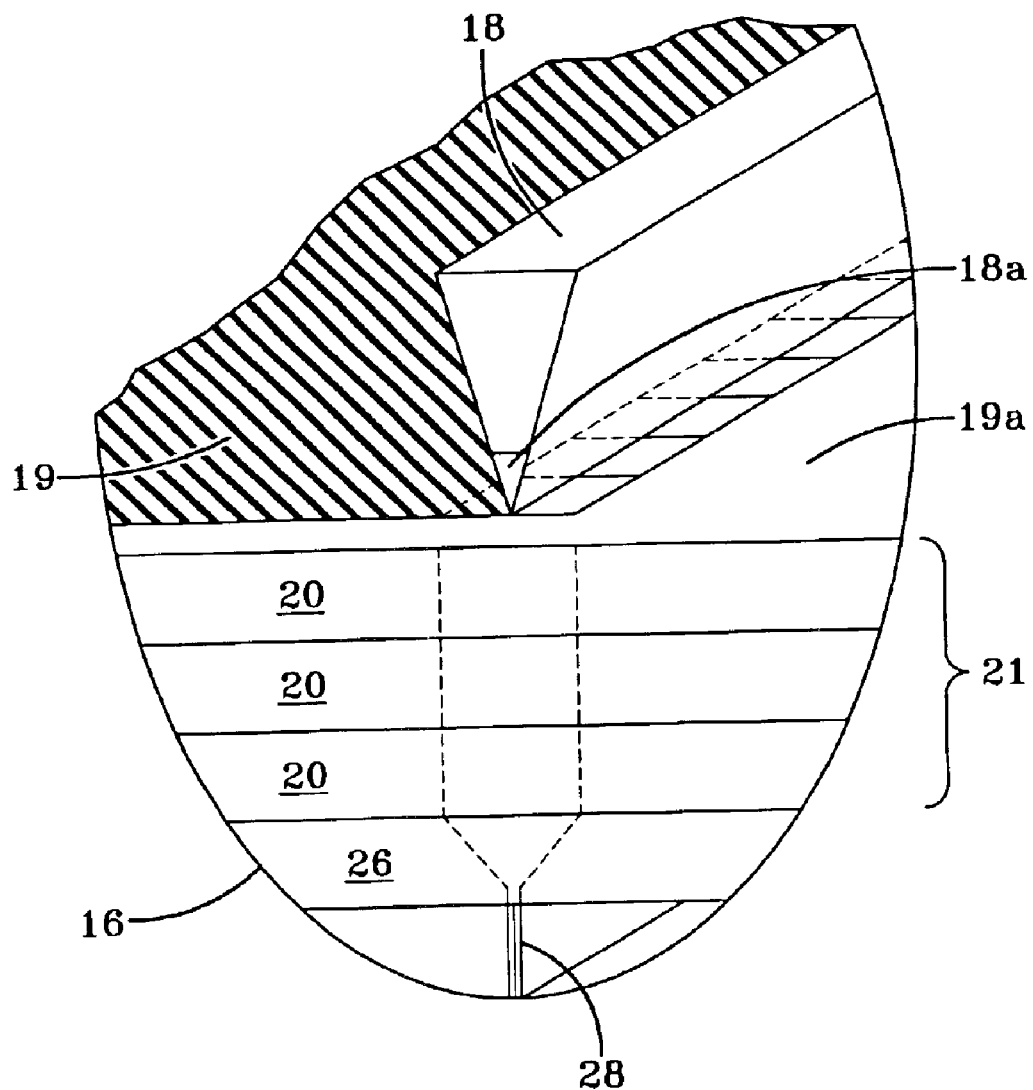
FIG. 2 illustrates a perspective view of the portion of the apparatus where material enters the die.

Portion 16 of FIG. 1 is magnified in FIG. 2 to show the detail of the die configuration used with extruders 12 and 12a. A wedge or V-block 18, shown as transparent so its relationship to the die stack 21 can be seen, can be used as a directing means to direct material streams 19 and 19a in the direction of a stack 21 of die plates 20. Mixing of the material streams would prevent the stated purpose of the invention, i.e., providing separate, layered materials, and accordingly, the apex 18a of the V-block is held tightly against the top die plate 20 in the die plate stack 21. Other directing means can also be used to direct the flow of separate material streams into channels in a die array without mixing the streams, such as providing a sufficient space between the two materials stream. Wedge 18 has an advantage in that the pressure exerted by each of the extruders is directed against pressure exerted by the other, whereas some other directing means may require special augmentation to handle the pressure from the two extruders. Whatever means is used, in the present invention of forming a closed article, when positioned above the first plate 20 in the stack 21, the separating means is circular to create two separate concentric streams of material into the first die.

Figure 3:
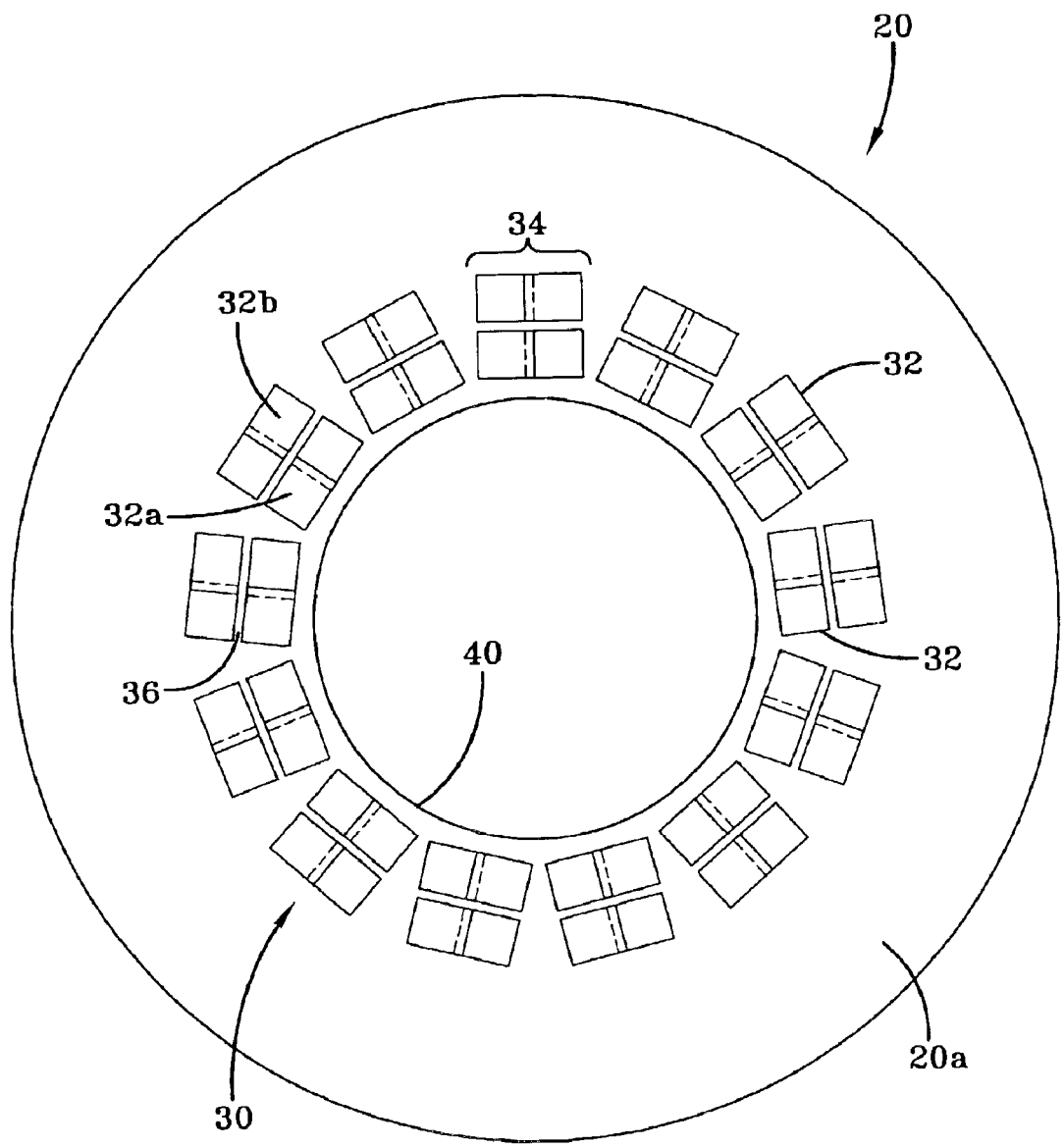
FIG. 3 illustrates one side of the die array of a die plate to producing a closed multi-layered article.

A top side of an individual die plate 20 is illustrated in FIG. 3. For convenience, this side will be referred to as the horizontal plate side 20a. The die plate 20 has a circular die array 30 formed by a plurality of rectangular die channels 32. On the horizontal plate side 20a, the longer axis of the rectangular channel is oriented along a sector of the circular plate 20. Were the channels 32 of the array 30 to be arranged linearly, the longer axis would be horizontally oriented, thus this side of the plate 20 is identified as the horizontal plate side. The die channels 32 are stacked in pairs 34. The channels 32 in each pair 34 are separated by a septum 36. To compensate for the circular array of rectangular channels, the area between the channels 32 is flared at the radially outer end relative to the center of the die plate 20. The number of channels 32, as well as the size of the channels 32, in the array 30 can vary. Ideally, the array 30 has at least six pairs of channels, thus having at least 12 individual channels.

The center of the die plate 20 may be solid or removed; the center of the plate 20 of FIG. 3 is removed. If the closed article is to be extruded onto a mandrel, than the center of the die plates 20 are removed to create a central channel 40 for the mandrel. The choice of whether or not to build on a mandrel is based upon the article use, materials, and manufacturing method of the article. Additionally, if the mandrel is solid, than the central channel is left completely open. If the mandrel is a hollow mandrel, the engineer may choose to provide a central plate thereby creating an open ring in the die plate 20 through which the mandrel passes. The successive series of central plates may be secured to one another by securing means passing through all of the central plates and may be sized differently to accommodate different mandrel sizes.

Figure 4:
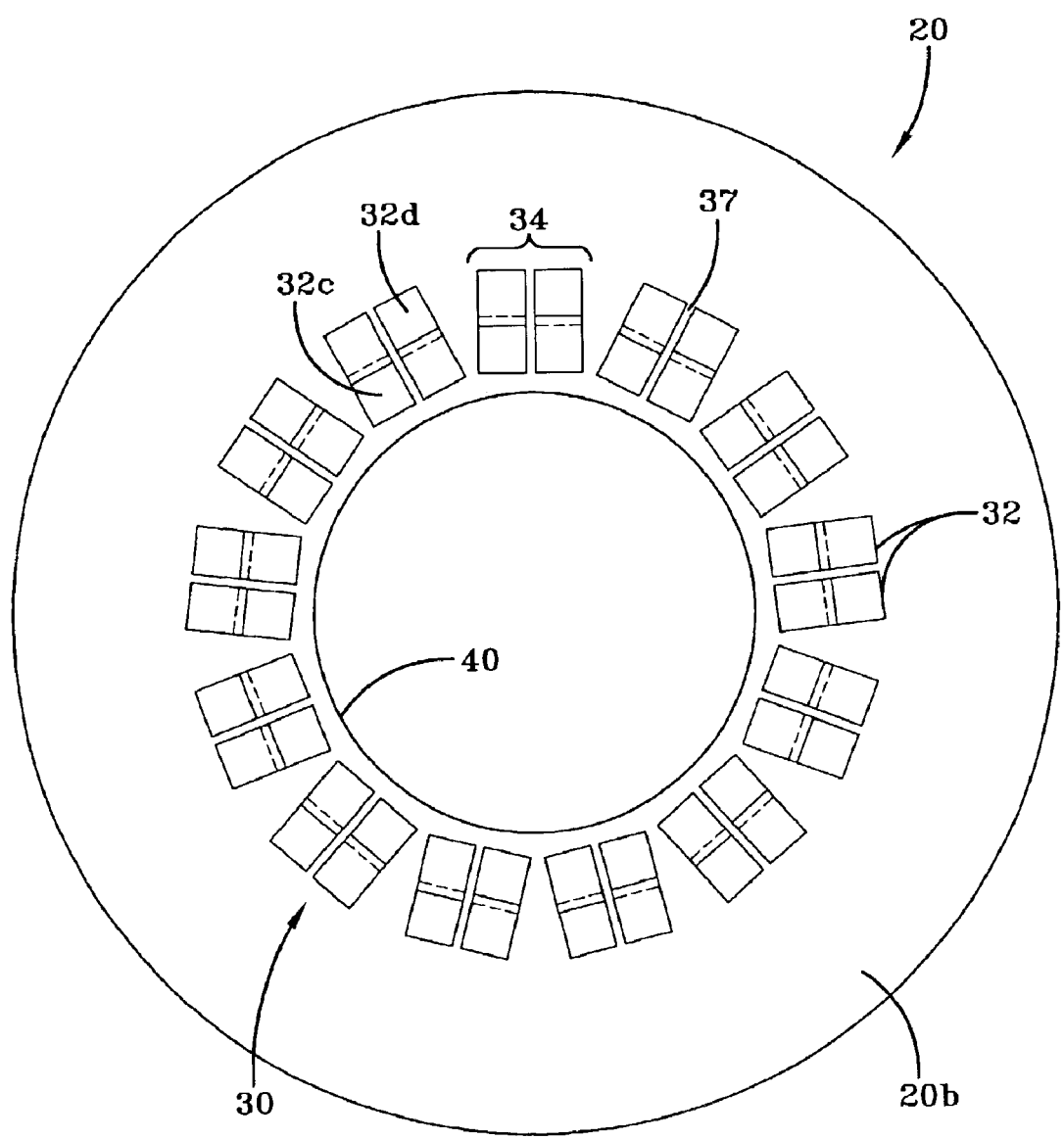
FIG. 4 illustrates, in reverse, the die array of a die plate.

FIG. 4 illustrates the reverse side 20b of the plate 20, which will be referred to as the vertical plate side 20b. The vertical plate side 20b has a plurality of radially extending rectangular channels 32 separated by septums 37. Again, the channels 32 are paired. The first channel 32c tapers radially inward and the second channel 32d tapers radially outwardly.

Each channel pair 34 has one radially inner channel 32a that tapers clockwise as viewed from the horizontal plate side 20a, and one radially outer channel 32b that tapers counter-clockwise as viewed from the horizontal side 20a, see FIGS. 3 and 5. FIGS. 5–7 illustrates the plates 20 and the die array 30 and channels 32 in reverse; that is, what is drawn are the edges of the open channels to more clearly illustrate the configuration of the channels 32 and the re-orientation of each channel 32. The array of FIGS. 3 and 5 may be considered to have a clockwise hand configuration, based on the inner ring of channels 32. In the die plate stack 21, alternating die plates 20 may have a different hand configuration. For example, if the first die plate 20 in a stack 21 has a clockwise hand configuration, then the subsequent die plate 20 will have a counter-clockwise configuration, based on the inner ring of channels, wherein the inner ring of channels taper counter-clockwise. FIG. 6 illustrates a channel pair 34 with a counter-clockwise hand. The counter-clockwise hand configuration is the mirror image of the clockwise hand configuration. This makes it possible to provide a vertical stack of dies since the first die moves the material streams to clockwise and the adjacent die moves the material stream back counter-clockwise, so that the vertical offset of the produced article does not change. However, since the produced article is a closed array, the stack 21 may be characterized by plates all having a clockwise or counter-clockwise configuration.

To understand how the how the streams flow through the die array to form a layered article, a pair of stacked die channel pairs 34u, 34l is shown in FIG. 7. The channels have a counter-clockwise configuration. Assuming that a single stream of a single material enters each top channel 50, 51 of the upper channel pair 34u, the streams entering the top channels 50, 51 are compressed through the respective taper of the channels 50, 51 and reoriented as the streams exit the channels 50, 51. But as the streams exit the channels 50, 51, they are each split into two streams by the septum 36 of the adjacent channel pair 34l. Thus, each channel 52, 53 of the lower channel pair 34l, receives one-half of each initial stream. Each half stream received in each lower channel 52, 53 are forced to merge by the respective tapers, creating a new layered stream (having 2 distinct layers) that is then divided by the septum of the next channel pair. In the subsequent channel pair (not illustrated), the two layered stream, having been split by the septum of the subsequent channel pair is forced to merge with another two layered stream, forming a four layered stream.

In this manner, by stacking die plates 20 on top of one another, the material streams are divided, merged, and rerouted as they pass through each subsequent die plate. This occurs until the material streams have a final convergence at the profile die 26, which consolidates the individual streams into extrudate 28. In this manner, the original two streams of material are divided and stacked producing a function of $2^n$ layers of material in the extrudate 28 that exits the profile die 26, where n is the number of die arrays 30 in the die plate stack 21. Since the article being produced is a closed article, the profile die 26 has a closed passageway to form a final closed article. Similar to the die plates 20, the profile die 26 may have means to allow for passage of a mandrel if required.

The closed articles produced by the die plates 20 have can two different layering configurations. The first closed article 40 has the two materials in alternating concentric rings, see FIG. 8. The second article 42 has the two materials in alternating sectors along the cross-section of the annular article, see FIG. 9. Both articles are formed using identical die plates 20 of the type described above, the difference being in the stacking manner of the top two die plates 20.

When a die plate 20 is oriented such that the flow streams enter the plate 20 from the horizontal side 20a, the resulting exit streams are vertically arranged, relative to the center of the die. When the series of hand alternating dies 20 are stacked such that the material entrance side is always the horizontal side, than the final product will be defined by the materials in alternating sectors as in FIG. 9.

Figure 8:
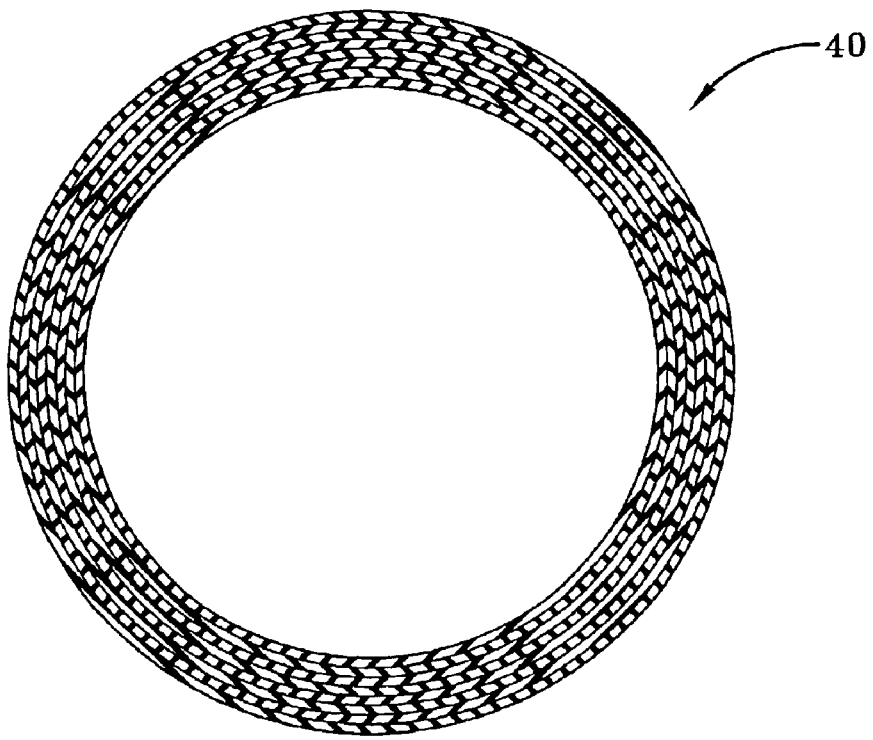
FIG. 8 is a cross-sectional of a product with radial layering.
Figure 9:
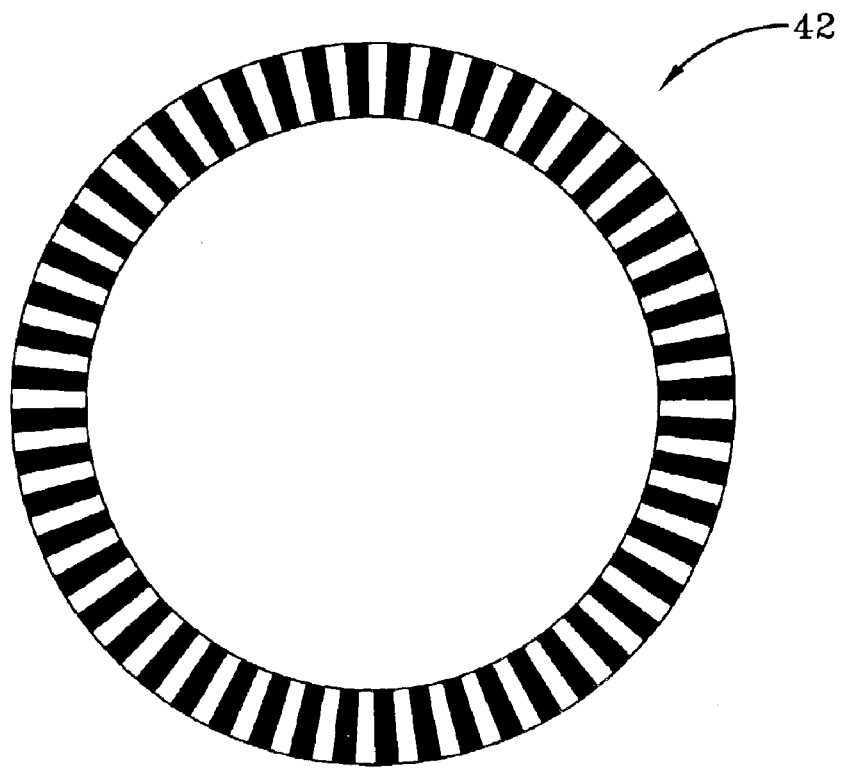
FIG. 9 is a cross-sectional of a product with sector layering.

To form the alternating concentric rings of FIG. 8, the material entrance side of the first die plate 20 is the horizontal side, but the material entrance side of the second die plate is the vertical side. Thus, as the materials leave the first die plate in a vertical orientation and enter the second die plate, the streams are not instantly reoriented to horizontal. The streams are instead horizontally reoriented as they exit the die plate. Each subsequent die plate is then stacked to have the vertical plate side as the material entrance side so that as the material exits the last die plate and enters the profile die 26, the layers are horizontally oriented and become concentrically arranged in the formed article due to merging of the streams at the profile die 26.

To achieve a concentrically arranged article 40, the first die plate may also be oriented to have the material entrance side by the vertical side to achieve instantly horizontally oriented streams. However, maintaining separation of the two material streams at the first die plate 20, while possible, is more complicated. In such a stack 21, all the dies 20 have the vertical plate side as the material entrance side.

The die plate 20 and die array 30 can be used to form any type of closed configuration article. The possible array configuration include any closed curvilinear configuration such as circular, elliptical, or obround, or any closed rectilinear configuration such as tetragon, rectangular, square, or trapezoidal. The closed configuration will depend on the finished article and further manufacturing steps. The configuration of the profile die 26 may mimic the array configuration or may vary slightly; the selection is dependent upon the desired product.

The choice of materials can vary also. The materials 19, 19*a* from each extruder may be identical wherein just the act of layering the material in the disclosed manner improve the desired article properties. The materials 19, 19*a* may be compounded such that one stream 19 is a non-reactive mix and stream 19*a* contains the cure package such that cure begins along the layer boundaries created by the die plates 20. The materials 19, 19*a* may be two completely different materials. The selection of materials 19, 19*a* is endless and limited only by what can be produced and extruded into the die plates.

The closed article may be a hose. Tubes of different types and sizes can be also be produced. Another application is the formation of tire tread rings. The tread rings can be formed as a continuous tube that is then cut to a length equivalent to the tread width. Such a method of production can also be a first step in producing rolls of bags of the type used in the produce department of grocery stores or help-yourself sections of food stores. The applications are many.

What is claimed is:

1. A method of preparing a closed layered article comprising the steps of:
    (a) providing extruding means for simultaneously extruding at least two different material streams,
    (b) directing a first material stream into a first die channel,
    (c) directing a second material stream into a second die channel, whereby said first die channel and said second die channel direct said first material streams to be stacked and pressed side by side as it exits the die channels, and
    (d) providing a plurality of die channels side by side to form a die array to provide an extrudate of a closed configuration comprising at least four layers of the first material and the second material are being stacked alternately side by side vertically or concentrically.

2. The method of claim 1 comprising the further steps of:
    (e) stacking a plurality of die arrays wherein separating means are associated with the die arrays and divide the first and second streams of material into at least two portions, wherein each divided portion is stacked and pressed against another divided portion as it exits said die arrays.

3. The method of claim 1 comprising the further step of providing at least two different material compositions for the at least two different material streams.

4. The method of claim 1 comprising the further step of providing at least two different plastic materials for the at least two different material streams.

5. A method preparing a hollow, layered article comprising the steps of:
    (a) providing extruding means for simultaneously extruding at least two different material streams,
    (b) providing at least one die array having a plurality of die channel pairs, the die channel pairs having a first die channel a second die channel, the die channels pairs being arranged to form an array having a closed configuration;
    (b) directing a first material stream into a first die channel,
    (c) directing a second material stream into a second die channel, whereby said first die channel and said second die channel direct said first material streams to be stacked and pressed side by side as it exits the die channel pairs, and
    (d) directing the material streams through the at least one die array, forming an extrudate of a closed configuration wherein the first material and the second material in the extrudate are layered either side by side vertically or concentrically.

6. The method of claim 5 wherein the die array has a closed curvilinear configuration or a closed rectilinear configuration.

7. The method of claim 5 wherein the die array has a closed configuration selected from the group consisting of a circle, ellipse, obround, tetragon, rectangle, square, or trapezoid.

8. The method of claim 5 comprising the further step of providing at least two different material compositions for the at least two different material streams.

9. The method of claim 5 comprising the further step of providing at least two different plastic materials for the at least two different material streams.

* * * * *